Figures 2, 3:
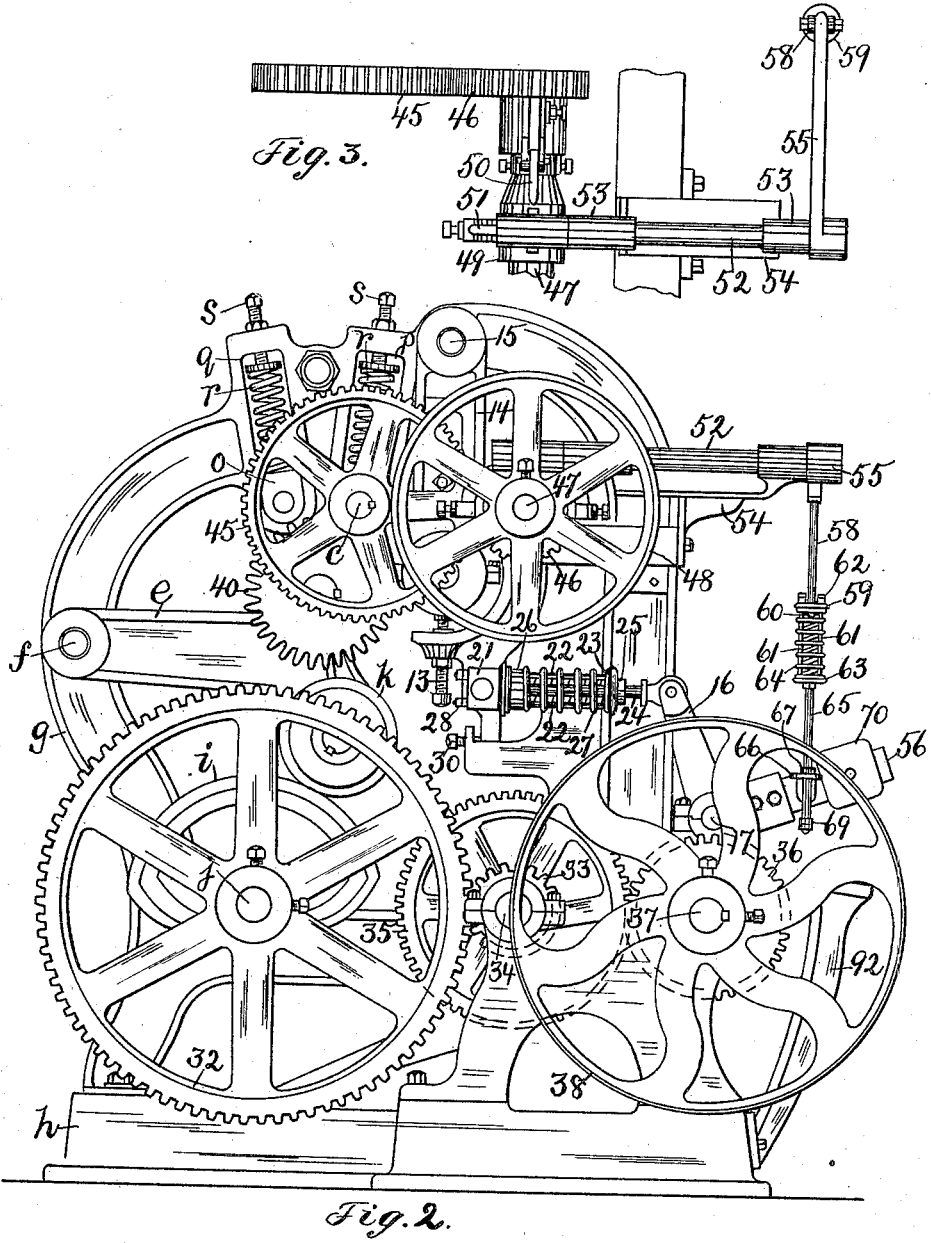

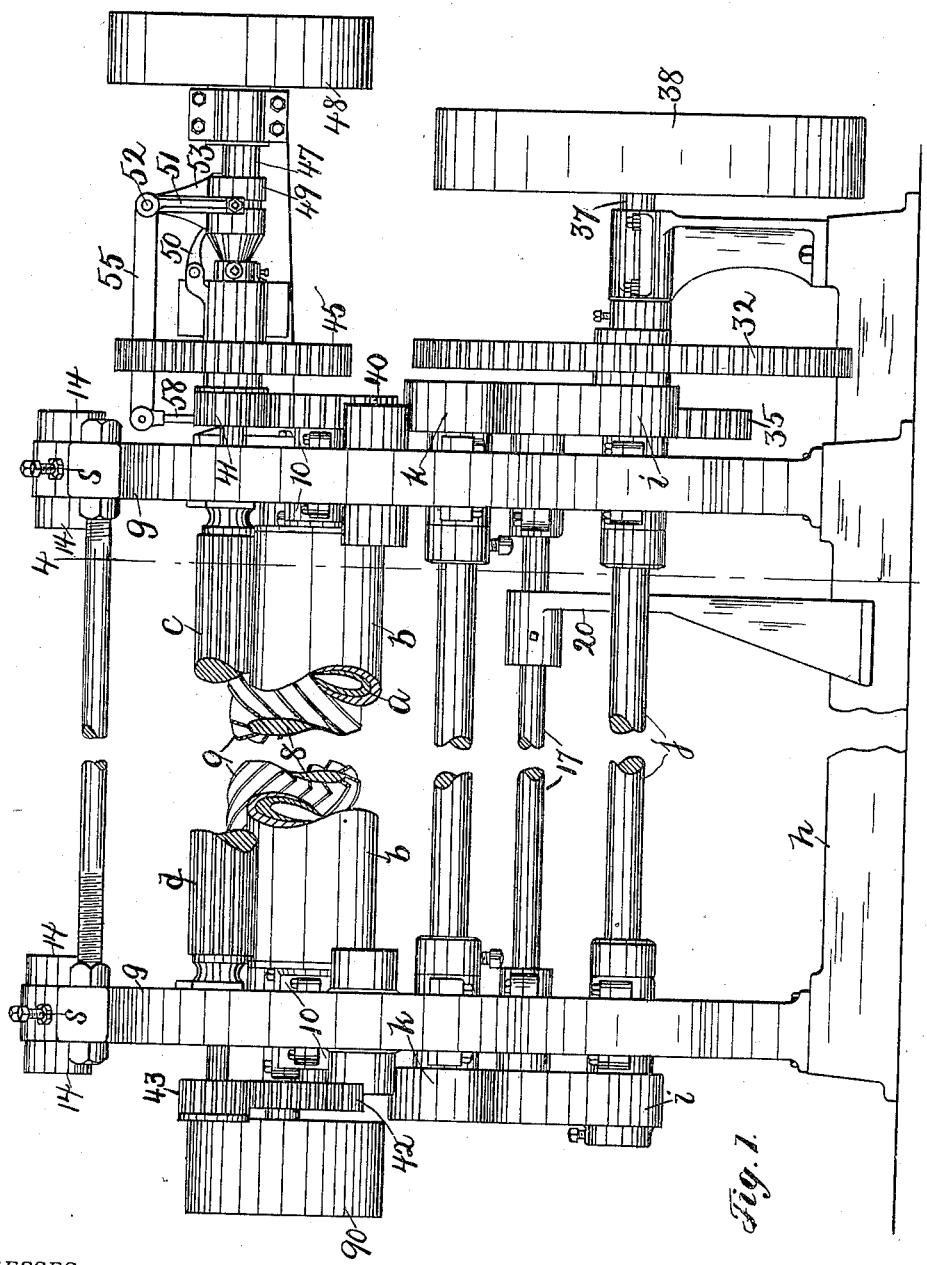

No. 726,306. PATENTED APR. 28, 1903.
A. F. JONES.
MACHINE FOR TREATING HIDES OR SKINS.
APPLICATION FILED AUG. 20, 1902.
NO MODEL. 5 SHEETS—SHEET 2.

WITNESSES:
INVENTOR.
Albert F. Jones
BY
Jas. H. Churchill
ATTORNEY.

No. 726,306. PATENTED APR. 28, 1903.
A. F. JONES.
MACHINE FOR TREATING HIDES OR SKINS.
APPLICATION FILED AUG. 20, 1902.
NO MODEL. 5 SHEETS—SHEET 3.

WITNESSES: INVENTOR.
C. R. Gannett Albert F. Jones
J. Murphy BY Jas. F. Churchill
ATTORNEY.

No. 726,306. PATENTED APR. 28, 1903.
A. F. JONES.
MACHINE FOR TREATING HIDES OR SKINS.
APPLICATION FILED AUG. 20, 1902.
NO MODEL. 5 SHEETS—SHEET 4.

Witnesses.
C. H. Garnett
J. Murphy

Inventor:
Albert F. Jones
By Jas. F. Churchill
Atty

No. 726,306. PATENTED APR. 28, 1903.
A. F. JONES.
MACHINE FOR TREATING HIDES OR SKINS.
APPLICATION FILED AUG. 20, 1902.
NO MODEL. 5 SHEETS—SHEET 5.

Witnesses.
Inventor.
Albert F. Jones
by Jas. H. Churchill.
Atty.

UNITED STATES PATENT OFFICE.

ALBERT F. JONES, OF SALEM, MASSACHUSETTS.

MACHINE FOR TREATING HIDES OR SKINS.

SPECIFICATION forming part of Letters Patent No. 726,306, dated April 28, 1903.

Application filed August 20, 1902. Serial No. 120,364. (No model.)

*To all whom it may concern:*

Be it known that I, ALBERT F. JONES, a citizen of the United States, residing in Salem, in the county of Essex and State of Massachusetts, have invented an Improvement in Machines for Treating Hides or Skins, of which the following description, in connection with the accompanying drawings, is a specification, like characters on the drawings representing like parts.

This invention relates to a machine for treating hides, skins, and leather, and is especially applicable, among other uses, for fleshing, unhairing, putting out, &c.

The invention has for its object to provide a simple and efficient machine for the purpose specified and one which can be operated with a minimum of labor on the part of the operator. For this purpose I employ a rotatable support or bed for the hide or skin, which is automatically moved into and out of its operative position and which in its operative position coöperates with a feed-roll or device between which the hide or skin is fed and with an operating-tool, preferably a rotatable cylinder or roll having blades or working edges suitable for the particular work to be performed. The operating cylinder or roll is mounted in suitable supports, preferably pivoted levers or arms, which are operatively connected with a treadle, whereby the operating-tool may be caused to engage the work with any desired pressure, according to the character of the work.

In the present instance provision is made in the machine herein shown as embodying this invention for placing the feed of the machine and the positioning of the operating-tool under the control of the operator and for enabling the position of the operating-tool to be changed within limits without disturbing the feed. These and other features of this invention will be pointed out in the claims at the end of this specification.

Figure 4:
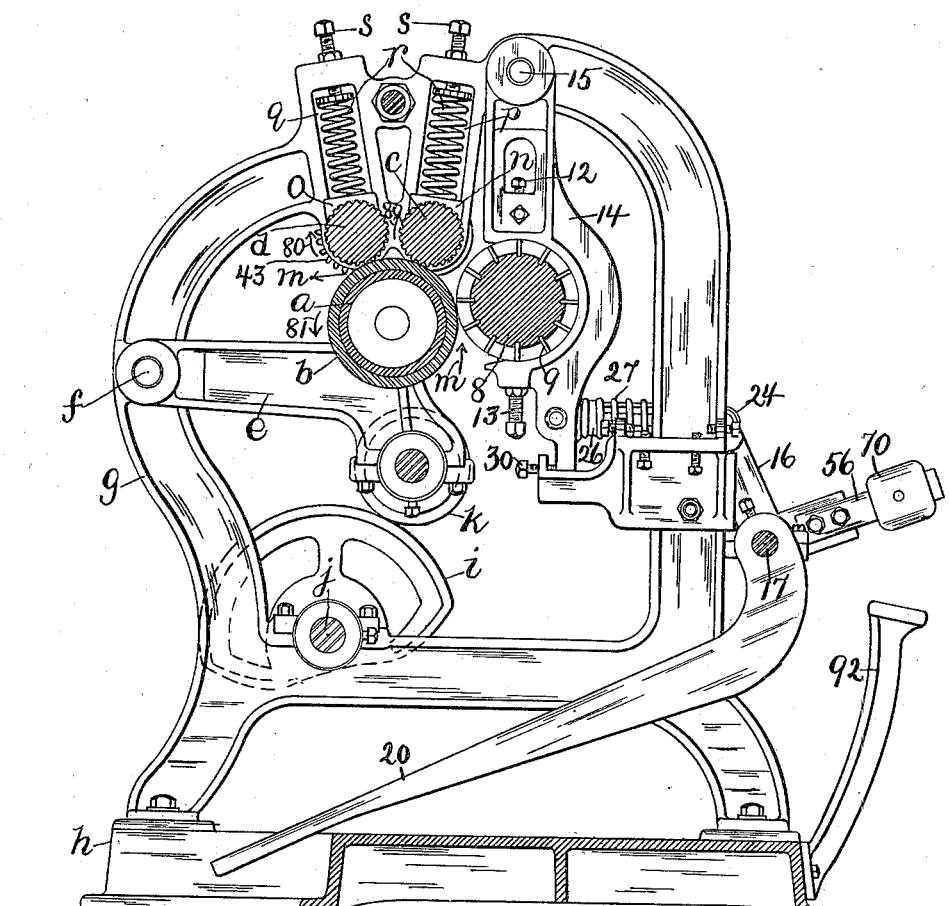
Figure 5:
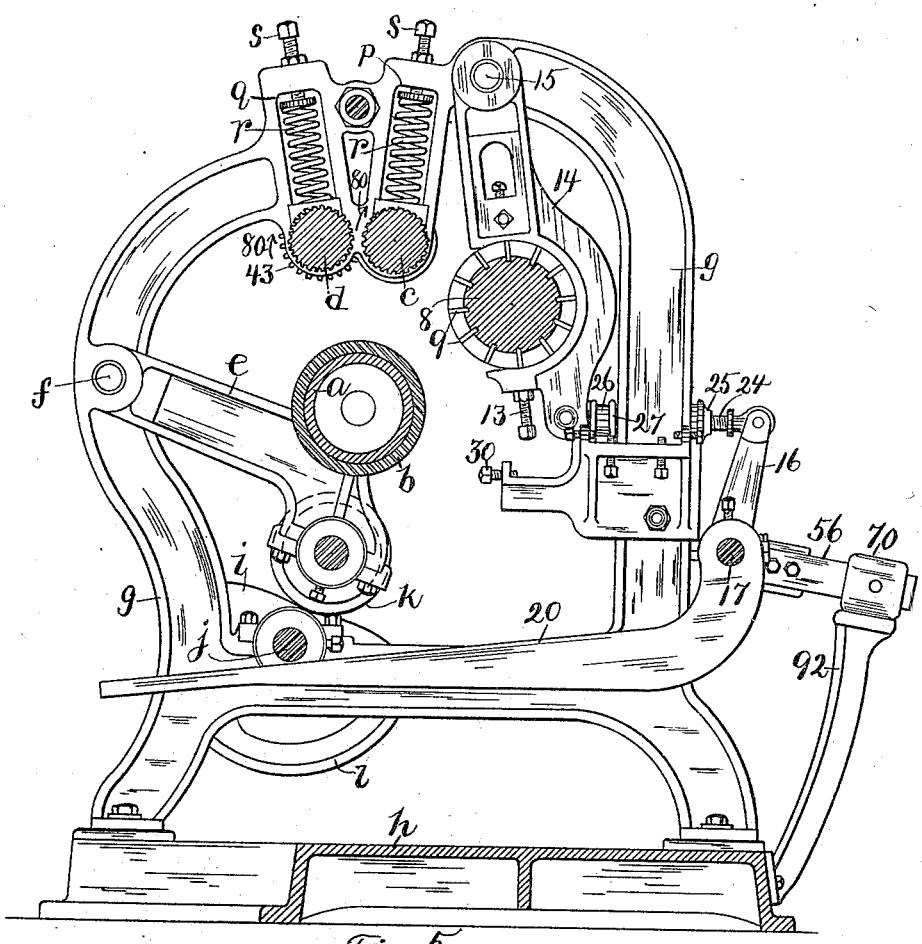
Figure 6:
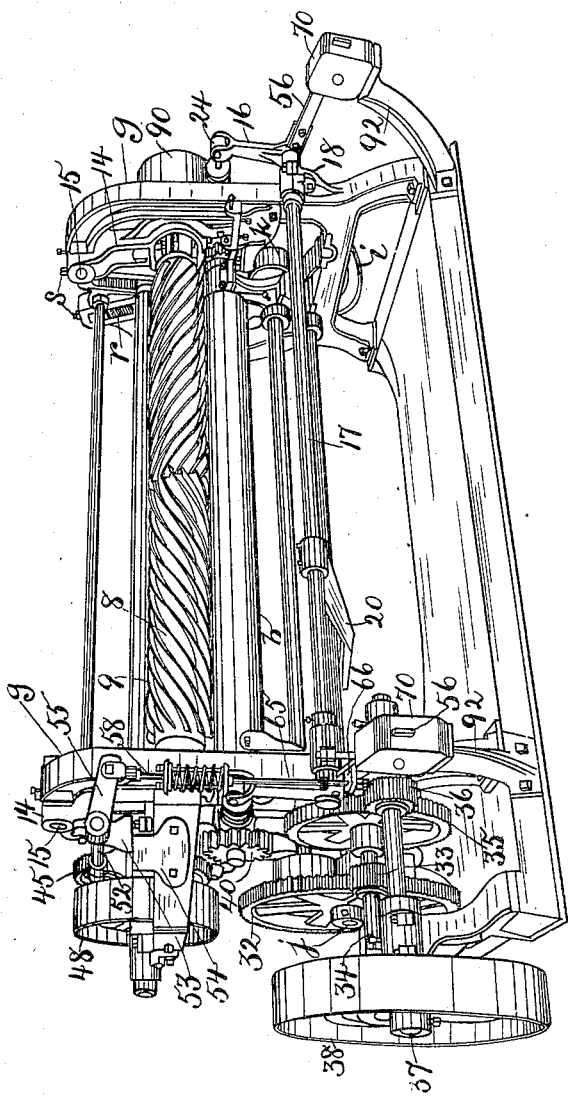

Figure 1 is a front elevation, with parts broken away, of a machine embodying this invention; Fig. 2, an end elevation of the machine shown in Fig. 1 looking toward the left; Fig. 3, a detail to be referred to; Fig. 4, a transverse section of the machine shown in Fig. 1, the section being taken on the line 4 4; Fig. 5, a similar section with the parts in their starting position; and Fig. 6 a perspective view, looking from the rear, of the machine shown in Fig. 1.

Referring to the drawings, $a$ represents a rotatable roll or support for the hide or skin to be treated, which roll may be of any suitable or desired construction and is provided with a yielding covering or bed $b$, of rubber or like material. The bed-roll $a$ is bodily movable with relation to one or more feed-rolls, (herein shown as two in number and marked $c\ d$,) and for this purpose the bed-roll is journaled in levers or arms $e$, located near the opposite sides of the machine and pivotally mounted on a tie-rod or stationary shaft $f$, connected to the side frames $g$ of the machine, the said side frames being secured to a suitable base $h$. The levers or arms $e$ are raised by means of cams $i$, fast on a shaft $j$, supported in the side frames of the machine, the said levers being provided, as shown, with rollers $k$, which are engaged by said cams and which are maintained in contact with the cams by gravity, as herein shown, which acts to lower the bed-roll when permitted so to do by the shape of the cam. The feed-rolls $c\ d$ may and preferably will be fluted longitudinally and coöperate with the bed-roll to feed the hide or skin out of the machine in the direction indicated by the arrow $m$. The feed-rolls $c\ d$, as shown, are mounted in journal-boxes $n\ o$, movable in suitable slots $p\ q$ in each side frame, and the said rolls are yieldingly held in engagement with the hide or skin by suitable springs $r$, the tension of which can be adjusted by the screws $s$. The hide or skin supported by the bed-roll in its raised position is adapted to be fleshed, unhaired, or otherwise treated by an operating-tool, preferably such as herein shown—namely, a cylinder or roll 8, having helically-arranged blades or working edges 9, adapted to the particular work to be performed.

The bladed roll or cylinder 8 is journaled in boxes 10, pivotally and adjustably supported by suitable set-screws 12 13 in levers or arms 14, pivotally attached at 15 to the side frames $g$, the pivot for said levers being in a substantially vertical line through the center of the operating-roll when said roll is in its operative position. The tool-supporting levers or arms 14 are placed under the control of the operator, and for this purpose the said levers are yieldingly connected to cranks 16 on the opposite ends of a rock-shaft 17, supported in suitable boxes 18, attached to the side frames of the machine.

The rock-shaft 17 is provided with a crank or arm 20, constituting a foot-treadle, by which the rock-shaft 17 can be rocked, so as to properly position the operating cylinder or tool with relation to the work. The yielding connections between the levers 14 and the cranks 16 may be of any suitable construction, but preferably that shown in Fig. 2, and each consists of a box 21, pivoted to the lever 14 and through which is loosely extended guide-rods 22, attached to a head 23, positioned on a bolt or rod 24 by a nut 25, the bolt or rod 24 having a head 26, through which the guide-rods 22 extend and between which and the head 23 is interposed a helical spring 27. The guide-rods are provided at their free ends with nuts 28. The bolt or rod 24 is pivotally connected to the crank 16. It will thus be seen that the operating cylinder or roll 8 is free to yield to compensate for unevenness in the thickness of the hide or skin. Further, the operating roll or cylinder is under control of the operator, and by reason of the roll being hung in pivotal supports having the center of their pivots in a substantially vertical plane through the center of the roll the bladed cylinder or roll can be moved into its operative position by the operator with substantially little foot pressure, thereby saving the strength of the operator and enabling him to perform an increased amount of work in a superior manner.

The forward movement of the operating-cylinder toward the bed-roll may be limited by adjustable stops herein shown as threaded rods or bolts 30 secured to the side frames and coöperating with the levers 14.

When the machine herein shown is in use, it is designed that the cam-shaft $j$ should rotate continuously, and for this purpose said shaft is separately driven, it being provided, as herein shown, (see Figs. 2 and 6,) with a gear 32, which meshes with a pinion 33 on a counter-shaft 34, suitably supported in the framework of the machine and provided with a gear 35, which meshes with a gear or pinion 36 on a shaft 37, provided with a pulley 38, which in practice may be drived from a main or countershaft. (Not shown.) During each rotation of the cam-shaft the cams $i$ elevate the bed-roll or support into its operative position and bring a gear 40 at one end of the shaft of the bed-roll $a$ into engagement with a pinion 41 (see Fig. 1) on the shaft of one feed-roll (shown as the roll $c$) and bring a gear or pinion 42 on the other end of the shaft of the bed-roll into engagement with a pinion 43 on the shaft of the other feed-roll, $d$. As a result both feed-rolls rotate in the same direction and opposite to the bed-roll, and the hide or skin on the bed-roll is fed toward the operator, who stands at the front of the machine and draws upon the hide or skin as it is fed forward out of the machine. The bed-roll and feed-rolls are designed to be put in rotation only when the operator desires, and for this purpose they are driven separately from the cam-shaft $j$, and to simplify the machine I prefer to control the rotation of the bed-roll and feed-rolls through suitable mechanism operatively connected with the treadle, as will be described.

Referring to Figs. 1, 2, and 3, the shaft of the feed-roll $c$ has mounted on it a gear 45, which meshes with a pinion 46 on a shaft 47, constituting the driving-shaft for the bed-roll and feed-rolls, the shaft 47 having fast on it a pulley 48, which is driven from a main or counter shaft. (Not shown.) The pinion 46 is normally loose on the shaft 47 and is adapted to be rendered fast thereon by a clutch, which may be of any suitable or desired construction and which is shown as a clutch-hub 49, keyed to the shaft 47 to slide thereon and coöperating with a finger 50 to render the pinion 46 fast on said shaft. The clutch-hub 49 is engaged by a crank or arm 51 on a rock-shaft 52, (see also Fig. 6,) supported in uprights 53, attached to a bracket 54, secured to a side frame $g$, the said rock-shaft having a second crank or arm 55, which is connected with an arm 56, attached to the treadle-shaft.

The connection between the treadle-shaft and the crank or arm 55 may and preferably will be yielding, for a purpose as will be described, it consisting of a link or rod 58, pivoted to the crank 55 and extended through a cap or washer 59 and provided with a nut 60. (See Fig. 2.) The cap 59 has loosely extended through it guide-rods 61, provided above the cap with nuts 62 and having their lower ends attached to a cap or washer 63, between which and the cap 59 is interposed a spiral spring 64. The cap or washer 63 has attached to it a rod 65, which is loosely extended through a lug or ear 66 on the arm 56, attached to the treadle-shaft, and provided above said lug or ear with a nut 67, forming an adjustable stop, by which the extent of movement of the treadle before acting on the clutch may be determined. The rod 65 is provided below the lug or ear 66 with a nut 69, which is engaged by the lug or ear when the treadle is raised by the counterweights 70 on the cranks or arms 56.

In operation the bed-roll is raised and lowered at each rotation of the cam-shaft, the cams $i$ being suitably shaped, so that the bed-roll is raised quickly, held in its elevated position for the greater part of the rotation of the cam-shaft, and then lowered quickly. When the bed-roll is in its lowered position, (shown in Fig. 5,) the operator throws one-half of the hide or skin over it, and when the bed-roll is raised by the cam into what may be termed its "working" position (represented in Fig. 4) the hide is gripped between the bed-roll and the feed-rolls, and when the bed-roll is in this position the operator depresses the treadle, which operates the clutch 49, as above described, and starts the bed-roll and the feed-rolls in rotation in the direction indicated by the arrows 80 81 in Fig. 4, thereby feeding the portion of the hide or skin within the machine past the bladed cylinder 8, which is by the same movement of the treadle brought into its operative position in engagement with the hide or skin on the bed-roll. The cylinder 8 is rotated by a suitable belt (not shown) which is passed about a pulley 90 on the shaft of said cylinder.

It will be noticed that in the construction herein shown the levers 14, carrying the bladed cylinder, are connected with the treadle by mechanism which is distinct from the mechanism which connects the treadle with the clutch, and, further, that provision is made by means of the lug 66 and nut 67 on the rod 65 for a predetermined movement of the treadle without effecting movement of the clutch. By this arrangement of parts the bladed cylinder or operating-tool may be partially or fully positioned before the clutch is operated. This permits the bladed cylinder to be moved back from its operative position a greater distance than otherwise, so as to obtain a substantially wide space or opening between the bed-roll in its lowered position and the bladed cylinder in its inoperative or withdrawn position, (shown in Fig. 5,) thereby affording ample room for the workman to place the hide or skin in the machine. By means of the yielding connection between the clutch and the treadle the bladed cylinder can be moved farther forward through its independent connection with the treadle without moving the clutch, which is desirable, in order that thin portions in the hide or skin may be effectively treated. It is also to be observed that the bladed cylinder is under control of the operator, and its position may be changed by varying the pressure of the foot upon the treadle. As a result, the operator at his will can vary the pressure of the bladed cylinder upon the work, increasing it where the hide or skin is thick and decreasing it where the hide or skin is thin. In other words, by placing the bladed cylinder under the control of the operator, so that its position with relation to the bed-roll can be changed at his will, a more sensitive machine is obtained. So, also, it will be noticed that the operator is required to exert only sufficient foot-pressure to move the levers which support the bladed cylinder in such position as to practically relieve the operator from moving the full or dead weight of said cylinder. As a result the machine can be quickly and easily operated with a minimum expenditure of power on the part of the operator and with a corresponding increase in the output of the machine.

The backward movement of the levers 14 may be limited by suitable arms or uprights 92, secured to the framework and coöperating with the counterweighted cranks or arms 56.

I claim—

1. In a machine of the class described, the combination with a bed-roll or work-support, pivoted levers in which said bed-roll or work-support is mounted, a rotatable shaft, cams thereon to effect movement of said levers and move said bed-roll or work-support into its operative position, feed-rolls coöperating with said bed-roll in its operative position, means for rotating said bed-roll and said feed-rolls, a bladed cylinder to act on the work, levers in which said bladed cylinder is mounted, a treadle, mechanism yieldingly connecting said treadle with said levers, a clutch mechanism controlling the rotation of said bed-roll and feed-rolls, and a yielding mechanism connecting said clutch with said treadle, substantially as described.

2. In a machine of the character described, the combination with a rotatable work-support, of a rotatable operating-tool coöperating therewith, means to support said tool, a clutch mechanism controlling the rotation of said work-support, a treadle, and independent mechanisms for connecting said treadle with said tool and with said clutch mechanism, for the purpose specified.

3. In a machine of the character described, the combination with a rotatable work-support, of a rotatable operating-tool coöperating therewith, means to support said tool, a clutch mechanism controlling the rotation of said work-support, a treadle, independent mechanisms for connecting said treadle with said tool and with said clutch mechanism and having yielding members, for the purpose specified.

4. In a machine of the character described, the combination with a rotatable work-support, of a rotatable operating-tool coöperating therewith, means to support said tool, a clutch mechanism controlling the rotation of said work-support, a treadle, mechanism connecting said treadle with said tool to move the same toward and from said work-support, and independent mechanism connecting said treadle with said clutch and having provision for permitting the said tool to be moved a predetermined distance before said clutch is operated, substantially as described.

5. In a machine of the character described, the combination with a feed-roll, of a bed-roll located below said feed-roll and movable bodily toward and from the same, means to support said bed-roll, a rotatable shaft provided with a cam to engage said supporting means and effect the bodily movement of said bed-roll, and means for rotating said bed-roll and feed-roll, substantially as described.

6. In a machine of the character described, the combination with feed-rolls mounted in a stationary support, a bed-roll located below said feed-rolls, a movable support for said bed-roll, a rotatable shaft, cams on said shaft in engagement with said movable support to move the bed-roll toward the feed-rolls, gearing for connecting the bed-roll with the feed-rolls to effect rotation of the feed-rolls in the same direction but in an opposite direction to the bed-roll, and means for controlling rotation of said bed-roll and feed-rolls, substantially as described.

7. In a machine of the character described, the combination with a rotatable bed-roll or work-support, movable supports for said roll, a cam-shaft, cams thereon to bodily move the support for said rolls, means to rotate said cam-shaft, a feed-roll, and a bladed cylinder coöperating with said bed-roll, and means for rotating said feed-roll and cylinder, said means being independent of the means for rotating the cam-shaft, substantially as and for the purpose specified.

8. In a machine of the character described, the combination with a rotatable and bodily-movable work-support, means for moving said work-support bodily, and means for rotating said work-support, of a feed-roll and a rotatable tool both coöperating with said work-support, and means for rotating said feed-roll independent of the means employed for rotating the work-support, substantially as described.

9. In a machine of the character described, the combination with a work-support, of a bladed cylinder coöperating therewith, vertically-arranged levers pivoted at their upper end and in which said cylinder is mounted, a rock-shaft, cranks or arms extended therefrom, yielding connections between said cranks and the lower end of said levers, stops to limit the movement of the said levers, and means for operating said rock-shaft, substantially as described.

In testimony whereof I have signed my name to this specification in the presence of two subscribing witnesses.

ALBERT F. JONES.

Witnesses:
   JAS. H. CHURCHILL,
   J. MURPHY.